United States Patent [19]

Nakajima

[11] Patent Number: 4,542,972
[45] Date of Patent: Sep. 24, 1985

[54] AUTOMATIC FOCUS CONTROLLING CAMERA

[75] Inventor: Yukio Nakajima, Kanagawa, Japan
[73] Assignee: Olympus Optical Co., Ltd., Tokyo, Japan
[21] Appl. No.: 520,614
[22] Filed: Aug. 5, 1983
[30] Foreign Application Priority Data Sep. 6, 1982 [JP] Japan ................................ 57-154884

[51] Int. Cl.⁴ .............................................. G03B 3/10
[52] U.S. Cl. .................................... 354/402; 354/409
[58] Field of Search ................................ 354/400–409, 354/484, 173.1, 173.11; 352/140, 142

[56] References Cited

U.S. PATENT DOCUMENTS

| 4,104,650 | 8/1978 | Hosoe et al. ..................... 354/409 X |
| 4,341,953 | 7/1982 | Sakai et al. ...................... 354/409 X |
| 4,359,276 | 11/1982 | Tomori ............................... 354/400 |
| 4,370,044 | 1/1983 | Maida ............................... 354/173.1 |
| 4,443,086 | 4/1984 | Hosoe et al. ..................... 354/401 X |
| 4,460,258 | 7/1984 | Fukuhara ............................. 354/402 |

FOREIGN PATENT DOCUMENTS

| 55-153931 | 5/1979 | Japan ................................... 354/409 |
| 55-155337 | 12/1980 | Japan ................................... 354/195 |
| 57-108813 | 7/1982 | Japan . |

Primary Examiner—William B. Perkey
Attorney, Agent, or Firm—Louis Weinstein

[57] ABSTRACT

An automatic focus controlling camera includes a taking lens barrel which is capable of automatically establishing an in-focus condition. The taking lens barrel includes an automatic focus detector circuit to enable an automatic focussing operation in response to the depression of a shutter release button disposed on a camera body or in response to an operation of a manual member disposed on the taking lens barrel whenever the taking lens barrel is mounted on the camera body. Signal transmitting means is disposed on the taking lens barrel for receiving a signal from the shutter release button disposed on the camera body.

7 Claims, 2 Drawing Figures

AUTOMATIC FOCUS CONTROLLING CAMERA

BACKGROUND OF THE INVENTION

The invention relates to an automatic focus controlling camera, and more particularly, to such camera having an automatic focus detecting circuit which is disposed on a taking lens barrel for the focussing purpose.

A camera having a focus status display function to indicate a front focus, in-focus and rear focus, for example, by detecting a focus status in response to incident light from object being photographed, is already known. Such camera has only the function of displaying a focus status, but lacks a so-called auto-focus (automatic focus controlling) function which automatically achieves an in-focus condition by driving a taking lens. Accordingly, an inconvenience is experienced in that a manual focussing must be performed, by operating a distance ring disposed around the taking lens barrel.

A camera is also known which has a focus status detecting mechanism disposed on a camera body and a taking lens drive mechanism which is disposed on the taking lens barrel. With this camera, an operating member disposed on the taking lens barrel must be operated in order to achieve an in-focus condition. This operating member is separate from another operating member which is used to trigger a shutter release operation of the camera, and thus is inconvenient to use.

A taking lens barrel which is detachably mounted on a camera body and having an auto-focus function to cause a taking lens to be automatically moved to an in-focus position by determining a distance to an object to be photographed is already known. With this taking lens barrel, an operating member which triggers an automatic focus controlling operation is disposed on a part of the lens barrel and must be operated to achieve an in-focus condition, whereupon a shutter release button of the camera must be depressed to take a picture. Again, the operating member is inconvenient to use, and a shutter chance may be missed.

SUMMARY OF THE INVENTION

It is an object of the invention to provide an automatic focus controlling camera including an automatic focus detecting circuit disposed on a taking lens barrel and which may be operated in response to the operation of a shutter release button provided on the part of a camera body or to the operation of an operating member disposed on the taking lens barrel whenever the taking lens barrel having an auto-focus function is mounted on the camera body.

In accordance with the invention, the depression of a shutter release button, disposed on the part of the camera body, to a half-way position activates an automatic focussing function of the taking lens barrel, thus dispensing with the need to operate an operating member disposed on the barrel in order to achieve an in-focus condition. When an in-focus condition is achieved in the barrel, a further depression of the shutter release button allows a photographing operation to be triggered in succession to the focussing operation.

DESCRIPTION OF PREFERRED EMBODIMENT

Figure 1:
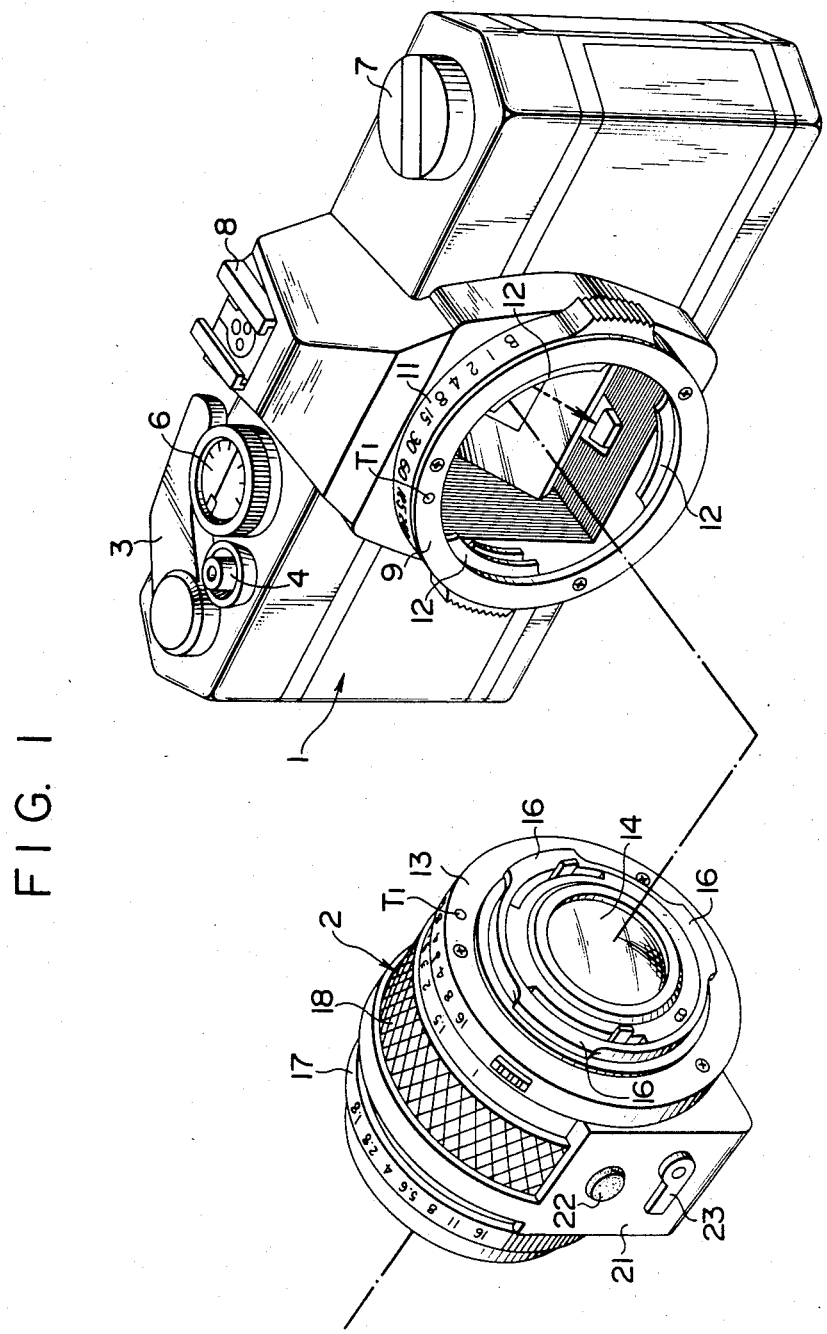
FIG. 1 is a perspective view of an automatic focus controlling camera according to one embodiment of the invention, with a taking lens barrel removed from a camera body.

FIG. 1 shows an automatic focus controlling camera according to one embodiment of the invention, with a taking lens barrel 2 removed from a camera body 1. It will be seen that the camera represents a single lens reflex camera having an interchangeable lens. A film winding lever 3, shutter release button 4, film speed presetting dial 6 and film rewind knob 7 are disposed on the top surface of the camera body 1. The top surface of a pentaprism housing is provided with a shoe 8 which permits an electronic flash to be mounted thereon.

A body mount ring 9 is disposed centrally in the front side of the camera body 1, and is surrounded by a shutter dial 11. The taking lens barrel 2 is mounted in the body mount ring 9 through a bayonet engagement between pawls 12 formed on the inside of and extending radially inward from the body mount ring 9 and mating pawls 16 formed on the outside of a rear extension of a lens mount ring 13 which is adapted to be brought into opposing relationship with the body mount ring 9, at locations chosen to avoid an interference with a taking lens 14. When the camera body 1 and the barrel 2 are properly coupled together, a contact $T_1$ formed on the body mount ring 9 engages with a contact $T_1$ formed on the lens mount ring 13 to provide an electrical interconnection between electrical circuits provided within the camera body 1 and the barrel 2, respectively (see FIG. 2). These electrical circuits are also electrically connected together through a ground connection, which is shown in FIG. 2 as a common contact $T_0$.

A casing 21 which houses a lens drive motor $M_1$ (see FIG. 2) and an automatic focus detector and driver circuit 25 (see FIG. 2) depends downwardly from the bottom of the barrel 2 intermediate its length. A button 22 which is operated to close an in-focus activate switch SW21 (see FIG. 2) and a power switch lever 23 which operates a power switch SW23 (see FIG. 2) are disposed on one side of the casing 21. In FIG. 1, numeral 17 represents a diaphragm presetting ring and 18 a distance adjusting ring.

Figure 2:
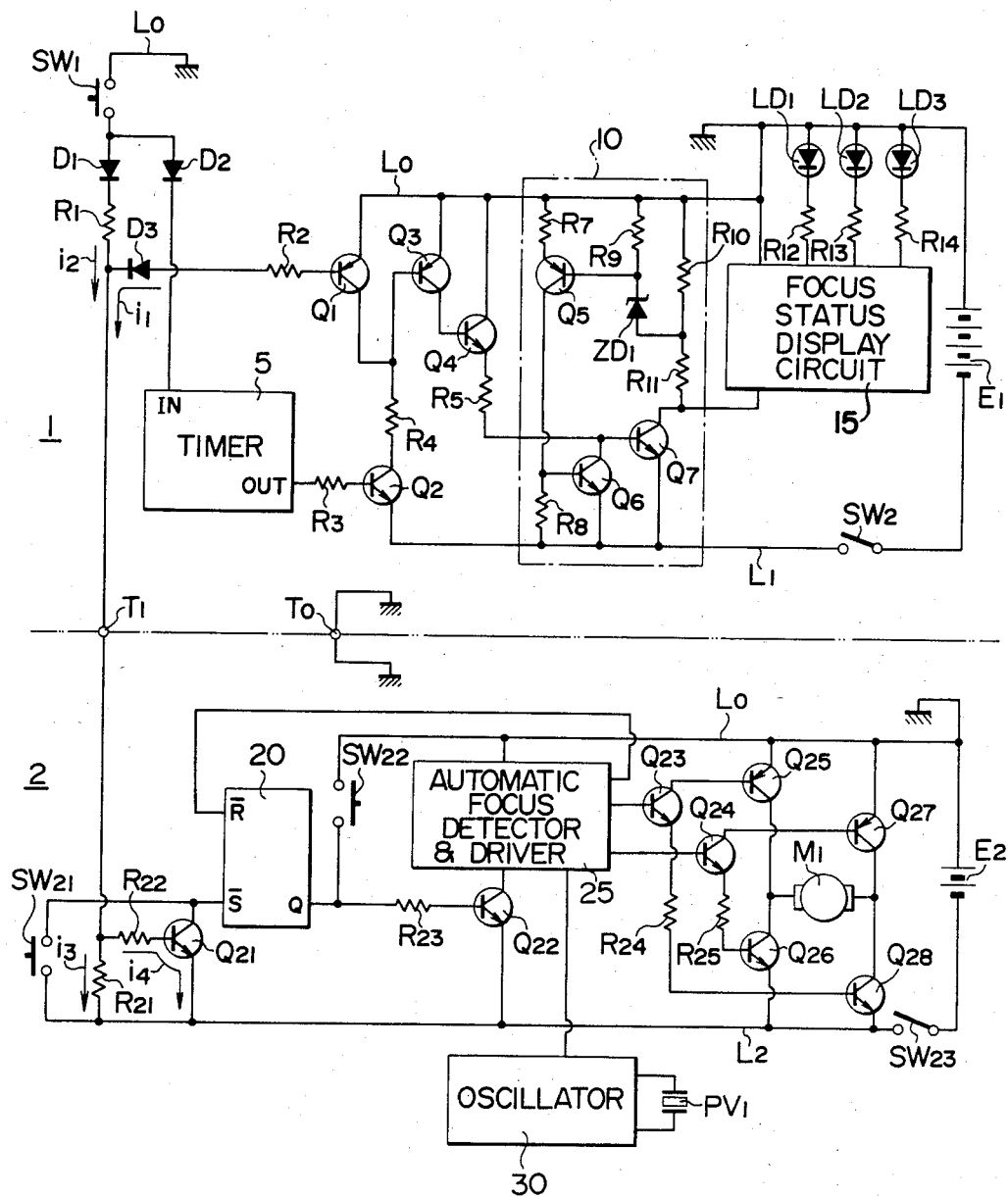
FIG. 2 is a circuit diagram of an electrical circuit used in the automatic focus controlling camera of FIG. 1.

FIG. 2 shows a circuit diagram of an electrical circuit used in the automatic focus controlling camera shown in FIG. 1. The upper block shown above a phantom line represents the electrical circuit disposed within the camera body 1 while the lower block represents the electrical circuit disposed within the barrel 2.

The electrical circuit in the camera body 1 includes a self-resetting, focus detection activate switch SW1 which is closed in response to the depression of the shutter release button 4 (see FIG. 1) to half its stroke. The switch SW1 has its one end connected to a common or ground line $L_0$ and its other end connected through a series combination of diode D1 and resistor R1 to the contact $T_1$. The aforesaid other end of the switch SW1 is also connected through a diode D2 to the input IN of a timer 5, which functions to establish a time interval during which a focus status is to be displayed on the part of the camera body 1 whenever the switch SW1 is closed. To this end, it produces a signal of "H" level at its output terminal OUT during a given time interval which begins with the application of a signal of "H" level to its input IN. The output terminal OUT is connected through a resistor R3 to the base of an NPN transistor Q2, the emitter of which is connected to a supply bus $L_1$ which is connected to the negative terminal of a battery $E_1$, or a power source, provided in the camera body 1 through a power switch SW2. The collector of the transistor Q2 is connected through a resistor R4 to the collector of a PNP transistor Q1 and also to the base of a PNP transistor Q3. The transistor Q1 functions as a bypass transistor which disables the display function within the camera body 1 whenever a power switch SW23 disposed within the barrel 2 is closed. Specifically, the transistor Q1 has its base connected to the contact $T_1$ through a series combination of a resistor R2 and diode D3, and has its emitter connected to the common line $L_0$ which is connected to the positive terminal of the battery $E_1$. The transistor Q3 has its emitter connected to the line $L_0$ and its collector connected to the base of the NPN transistor Q4, which has its collector connected to the line $L_0$ and its emitter connected through a resistor R5 to the base of an NPN transistor Q7.

The transistor Q7 forms a constant voltage circuit 10 together with transistors Q5 and Q6 and resistors R7 to R11 as well as Zener diode ZD1. Specifically, the transistor Q7 has its emitter connected to the bus $L_1$ and its collector connected through a series combination of resistors R11 and R10 to the line $L_0$, with the junction between the resistors R11 and R10 connected to the anode of the Zener diode ZD1. The cathode of the Zener diode ZD1 is connected through a resistor R9 to the line $L_0$ and is also connected to the base of a PNP transistor Q5. The transistor Q5 has its emitter connected through a resistor R7 to the line $L_0$ and its collector connected through a resistor R8 to the bus $L_1$ and also connected to the base of an NPN transistor Q6. The transistor Q6 has its emitter connected to the bus $L_1$ and its collector connected to the base of the transistor Q7.

In the constant voltage circuit 10 thus formed, when the base of the transistor Q7 assumes its "H" level, a constant voltage is developed across the series combination of resistors R10 and R11 which is determined by factors including the breakdown voltage of the Zener diode ZD1. More specifically, when the base of the transistor Q7 assumes its "H" level, it is turned on, allowing a current flow through resistors R10 and R11, developing a voltage across their combination. Also there occurs a current flow through the Zener diode ZD1, and a potential is developed at the cathode of the diode ZD1 which has a given potential difference with respect to the potential at the junction between the resistors R10 and R11. Accordingly, the transistor Q5 is turned on and passes a current, the magnitude of which depends on the cathode potential of the diode ZD1. Consequently, the transistor Q6 is also turned on, passing a current, the magnitude of which depends on the collector current of the transistor Q5. This permits the base current to the transistor Q7 to be controlled. If the voltage between the collector of the transistor Q7 and the line $L_0$ tends to increase, the potential at the junction between the resistors R10 and R11 decreases, causing a rapid increase in the current flowing from the base of the transistor Q5 through the Zener diode ZD1. This increases the collector current of the transistor Q5 and hence that of the transistor Q6, whereby the proportion of a current flow into the base of the transistor Q7 relative to the current flow from the emitter of the transistor Q4 and passing through the resistor R5 decreases. This in turn increases the emitter-collector voltage of the transistor Q7, and hence the voltage between the collector of the transistor Q7 and the line $L_0$ decreases, thus maintaining a given voltage therebetween. On the contrary, if the voltage between the collector of the transistor Q7 and the line $L_0$ tends to decrease, a potential increase at the junction between the resistors R10 and R11 causes a rapid reduction in the current flow from the base of the transistor Q5 through the Zener diode ZD1. This reduces the collector current of the transistor Q5 and hence that of the transistor Q6, increasing the proportion of the current flow into the base of the transistor Q7 with respect to the current flow from the emitter of the transistor Q4 and passing through the resistor R5. This reduces the emitter-collector voltage of the transistor Q7, causing the voltage between the collector of the transistor Q7 and the line $L_0$ to be increased and returned to a given value. In this manner, a constant voltage is developed across the series combination of the resistors R10 and R11, which represent the output of the constant voltage circuit 10.

A focus status display circuit 15 has its positive and negative feed terminals connected across the series combination of the resistors R10 and R11, which form the output of the constant voltage circuit 10. While not shown, the display circuit 15 includes photoelectric conversion means which respons to a photoelectric output representing an image of an object being photographed which is projected thereon, by determining if the focus status of the image represents a front focus, an in-focus or a rear focus. In a corresponding manner, it changes one of a first to a third output of an "L" level. The first output is connected through a resistor R12 to the cathode of a light emitting diode LD1 which displays a front focus status. The anode of the diode LD1 is connected to the line $L_0$. The second output is connected through a resistor R13 to the cathode of a light emitting diode LD2, the anode of which is connected to the line $L_0$, thus displaying an in-focus condition. The third output is connected through a resistor R14 to the cathode of a light emitting diode LD3, the anode of which is connected to the line $L_0$, thus displaying a rear focus status. It is to be noted that the light emitting diodes LD1 and LD3 are disposed within a finder optics of the camera body 1, permitting a photographer to recognize the focus status when he views an image through the finder. Suitable apparatus for accomplishing this is shown in detail in my copending applications Ser. No. 369,178 filed Apr. 16, 1982, now U.S. Pat. No. 4,466,726, Ser. No. 432,318, filed Oct. 1, 1982, 1983, and assigned to the assignee of the present invention. The disclosures therein are incorporated herein by reference thereto.

On the other hand, the electrical circuit disposed with the barrel 2 includes the in-focus activate switch SW21 which is of a self-resetting type and which is closed by a manual operation. One end of the switch SW21 is connected to the set input $\overline{S}$ of an R-S flipflop 20, while its other end is connected to a bus $L_2$ which is connected through a power switch SW23 to the negative terminal of a battery $E_2$, or a power source, disposed within the barrel 2. A switching transistor Q21 of NPN type is connected in shunt with the switch SW21 and operates to command a focussing operation. Specifically, the transistor Q21 has its collector connected to the set input $\overline{S}$ and its emitter connected to the bus $L_2$. The base of the transistor Q21 is connected through a resistor R22 to the contact $T_1$, which is in turn connected to the bus $L_2$ through a resistor R21. The transistor Q21 is turned on by a current $i_2$ which flows into the electrical circuit within the barrel 2 through the contact $T_1$ when the switch SW1 provided on the part of the camera body 1 is closed, thereby applying a signal of "L" level to the set input $\bar{S}$ of the flipflop 20.

The flipflop 20 serves as a memory which holds a focussing operation effective lest the focussing operation should be interrupted in response to the opening of the switch SW21 or the turn-off of the transistor Q21. When an input signal of "L" level is applied to its set input $\bar{S}$, the flipflop 20 is triggered by the edge of the input signal to invert its output Q to its "H" level. Conversely, when an input signal of "L" level is applied to its reset input $\bar{R}$, the flipflop 20 is triggered by the edge of the input signal to return its output Q to its "L" level. The reset input $\bar{R}$ is connected to a first output of the automatic focus detector and driver circuit 25, which will be described in detail later. The output Q of the flipflop 20 is connected through a resistor R23 to the base of an NPN switching transistor Q22 which operates to control the power supply. The junction between the output Q and the resistor R23 is connected through a self-resetting, continuous operation command switch SW22 to a command or ground line $L_0$ which is connected to the positive terminal of the battery $E_2$. It is to be understood that the common line $L_0$ of the electrical circuit within the barrel 2 is connected to the common line $L_0$ of the electrical circuit within the camera body 1 through the common contacts $T_0$.

The transistor Q22 has its emitter connected to the bus $L_2$ and its collector connected to the negative feed terminal of the detector and driver circuit 25. The positive feed terminal of the circuit 25 is connected to the line $L_0$. Accordingly, the transistor Q22 operates as a power switch for the circuit 25. When the transistor Q22 is turned on, the circuit 25 is fed from the battery to initiate its operation.

The automatic focus detector and driver circuit 25 includes photoelectric conversion means, not shown, in the same manner as the display circuit 15, which responds to a photoelectric output representing the image of an object being photographed which is projected thereon, by determining if a focus status of the image on a photographic film surface represents a front focus status, an in-focus condition or a rear focus status. The circuit 25 has a first to a fourth output, and the first output is connected to the reset input $\bar{R}$ of the flipflop 20 as mentioned previously, providing a signal of "L" level when an in-focus condition is determined. The second and third outputs are connected to the bases of transistors Q23 and Q24, respectively, which form a drive control circuit for a lens drive motor M1. The second output assumes it "H" level when the front focus status is determined while the third output assumes its "H" level when the rear focus status is determined. The fourth output is connected to an oscillator 30 which drives a sound emitting element PV1 for indicating the in-focus condition for a given time interval. One suitable circuit for focussing the taking lens is described in my copending application Ser. No. 432,318 filed Oct. 1, 1982 and incorporated herein by reference thereto.

The transistors Q23 and Q24 are of NPN type, and the transistor Q23 has its collector connected to the base of a PNP transistor Q25 and its emitter connected through a resistor R24 to the base of an NPN transistor Q28. The transistor Q25 has its emitter connected to the line $L_0$ while its collector is connected to one end of the lens drive motor M1, the other end of which is connected to the collector of the transistor Q28. The emitter of the transistor Q28 is connected to the bus $L_2$. The transistor Q24 has its collector connected to the base of a PNP transistor Q27 and its emitter connected through a resistor R25 to the base of an NPN transistor Q26. The transistor Q27 has its emitter connected to the line $L_0$ and its collector connected to the other end of the motor M1. The collector of the transistor Q26 is connected to said one end of the motor M1 while its emitter is connected to the bus $L_2$.

The operation of the automatic focus controlling camera will now be described.

(1) When the power switch SW2 on the camera body 1 is closed and the power switch SW23 on the barrel 2 is open:

In this instance, the battery $E_2$ is not connected to the electrical circuit within the barrel 2, which therefore can not perform a focussing operation. Under normal condition when the shutter release button 4 is not depressed, the timer 5 produces an output of "L" level, which turns the transistors Q2, Q3 and Q4 off, thus preventing the constant voltage circuit 10 from operating. Consequently, the display circuit 15 is not fed, and no indication of the focus status by the light emitting diodes LD1 to LD3 takes place.

When the shutter release button 4 is depressed to half its stroke to thereby close the focus detection activate swich SW1, a signal of "H" level is applied to input IN of the timer 5 through the diode D2, whereby its output changes to its "H" level during a given time interval. This turns the transistor Q2 on, which in turn turns the transistors Q3 and Q4 on, allowing the constant voltage circuit 10 to initiate its operation. Consequently, the display circuit 15 is also fed and initiates its operation. Depending on the detected focus status which may be either the front focus, the in-focus or the rear focus status, one of the first to the third outputs is changed to its "L" level, illuminating a corresponding one of the diodes LD1 to LD3. Accordingly, a photographer manually operates the distance adjusting ring 18 on the taking lens barrel 2 in accordance with the indication of such focus status, thus manually achieving an in-focus condition.

(2) When the power switch SW2 of the camera is closed and the power switch SW23 of the barrel is closed:

In this instance, the battery $E_2$ is connected to the electrical circuit within the barrel, and hence a focussing operation of the barrel 2 is enabled. A current $i_1$ of a very low magnitude can flow through the common contact $T_0$, the emitter-base path of the transistor Q1, the resistor R2, diode D3, the contacts $T_1$, resistor R21 and switch SW23, thus creating a condition to enable the transistor Q1 to be turned on. A voltage drop produced across the resistor R21 by the current flow $i_1$ is less than a threshold voltage across the base and emitter of the transistor Q21, which transistor therefore cannot turn on.

When the shutter release button 4 is depressed to half its stroke to close the switch SW1, a signal of "H" level is applied to the timer 5 through the diode D2, whereby the timer produces an output of "H" level for a given time interval, thus turning the transistor Q2 on. When the transistor Q2 is turned on, the transistor Q1 through which the low current $i_1$ flows is turned on, whereby the transistors Q3 and Q4 are not turned on. Consequently, the constant voltage circuit 10 and the display circuit 15 are incapable of operation, preventing the display of a focus status on the part of the camera body 1. The purpose of preventing the display of the focus status whenever the power switch SW23 on the barrel 2 is closed is to avoid any confusion caused to a photographer who may be puzzled to choose either result to rely on and who may mistakenly believe the occurrence of the failure of either the camera body 1 or the taking lens barrel 2 if both the display circuit 15 and the automatic focus detector and driver circuit 25 operate to detect the focus status and produce contradicting results. However, it should be understood that such precautions may be avoided in an arrangement in which both circuits 15 and 25 produce the same result.

When the focus detection activate switch SW1 is closed, a current $i_2$ flows into the electrical circuit within the barrel 2 through diode D1, resistor R1 and the contacts $T_1$. The current $i_2$ has a greater magnitude than the current $i_1$, and is divided into currents $i_3$ and $i_4$ which flow through resistors R21 and R22, respectively, thus turning the transistor Q21 on. When the transistor Q21 is turned on, the set input $\bar{S}$ of the flipflop 20 assumes its "L" level, whereby its output Q assumes its "H" level. This turns the transistor Q22 on, feeding the automatic focus detector and driver circuit 25 to allow the detection of the focus status to be initiated. A suitable output is developed to one of the first to the fourth outputs depending on the detected focus status which may be either the front focus, the in-focus or the rear focus. When the detected focus status represents the front focus condition, the second output assumes its "H" level, whereby the transistors Q23, Q25 and Q28 are turned on to connect the motor M1 across the line $L_0$ and the bus $L_2$. Accordingly, the motor M1 rotates in a direction to move the lens from the front focus status to its in-focus condition. When the detected focus status represents the rear focus, the third output assumes its "H" level, whereby the transistors Q24, Q27 and Q26 are turned on to connect the motor M1 across the line $L_0$ and the bus $L_2$ in the opposite polarity from that established during the front focus status. Accordingly, the motor M1 rotates in a direction to move the lens from its rear focus status toward the in-focus condition. When the in-focus condition is reached, the circuit 25 reverts the second or the third output to its "L" level to stop the motor M1, and also changes its first output to its "L" level, thus resetting the flipflop 20. Hence, the Q output of the flipflop 20 returns to its "L" level, turning the transistor Q22 off to cease the operation of the circuit 25. Accordingly, the taking lens barrel 2 ceases to operate when the in-focus condition is achieved. When the in-focus condition is achieved, the circuit 25 develops an in-focus signal at its fourth output which is applied to the oscillator 30 to drive it for a given time interval, thus allowing the element PV1 to produce sound indicating that the in-focus condition is achieved. The use of the sound emitting element PV1 to indicate the in-focus condition within the barrel 2 assists in recognizing such fact without requiring a photographer, who is viewing the finder on the camera body 1, to turn attention away from the finder.

In the described operation under the paragraph (2), a focussing operation of the taking lens barrel 2 has been described as initiated by the closure of the focus detection activate switch SW1. However, it should be noted that the barrel 2 is capable of performing a focussing operation by itself if the barrel 2 is not coupled with the camera body 1 or if the switch SW1 is not closed. Specifically, if the focussing operation command switch SW21 is closed, a signal of "L" level is applied to the set input $\bar{S}$ of the flipflop 20, in a manner similar to that when the transistor Q21 is turned on, and thus a focussing operation can take place in the same manner as mentioned above. Similarly, if the continuous operation command switch SW22 is maintained closed, the transistor Q22 is turned on to enable a focussing operation in the similar manner. However, in this instance, the circuit 25 is fed as long as the switch SW22 remains closed, and hence the focussing operation is not interrupted if the in-focus condition is achieved, but rather the focussing operation takes place continuously in a manner tracking the movement or a change of an object being photographed.

If an ordinary taking lens barrel is mounted on the camera body 1, the focussing condition is displayed by the camera body 1 in the similar manner as mentioned under the paragraph (1).

What is claimed is:

1. An automatic focus controlling camera comprising:
   first manually operable means disposed on a camera body and operable in response to a depression of a shutter release button;
   an automatic focus detector circuit disposed within a taking lens barrel which is detachably mounted on the camera body for detecting a focus status of an object being photographed;
   drive means disposed on the taking lens barrel and responsive to an output from the automatic focus detector circuit for automatically moving a taking lens arranged on said barrel to an in-focus position;
   bistable circuit means having an output coupled to the automatic focus detector circuit;
   said bistable circuit means having a set input;
   second manually operable means disposed on the taking lens barrel and coupled to said bistable circuit means for enabling the automatic focus detector circuit for operation;
   a first switching element which is connected in shunt with said second manually operable means and is connected to said set input;
   operation signal accepting means disposed on the taking lens barrel for connecting the first manually operable means to the first switching element whenever the taking lens barrel is mounted on the camera body; and
   said bistable circuit means actuating said automatic focus detector circuit upon operation of said first manually operable means which applies an operation signal to said set input through said operation signal accepting means and said first switching element.

2. An automatic focus controlling camera according to claim 1 in which the automatic focus detector circuit is connected to a drive circuit associated with a lens drive motor and also to a drive circuit for a sound emitting element which indicates the in-focus condition.

3. An automatic focus controlling camera according to claim 1 in which the bistable circuit means includes a reset input which is reset in response to an in-focus detecting signal applied to said reset input by the automatic focus detector circuit.

4. An automatic focus controlling camera according to claim 1 further including a second switching element for connecting the automatic focus detector circuit to a power supply when the bistable circuit means is set by an operation signal at its set input.

5. An automatic focus controlling camera according to claim 4 further comprising third manually operable means disposed on the taking lens barrel for rendering the second switching element conductive to connect the power supply to the automatic focus detector circuit.

6. An automatic focus controlling camera comprising:

first manually operable means disposed on a camera body and operable in response to a depression of a shutter release button;

an automatic focus detector circuit disposed within a taking lens barrel which is detachably mounted on the camera body for detecting a focus status of an object being photographed;

drive means disposed on the taking lens barrel and responsive to an output from the automatic focus detector circuit for automatically moving a taking lens arranged on said barrel to an in-focus position;

second manually operable means disposed on the taking lens barrel for enabling the automatic focus detector circuit for operation;

signal transmitting means disposed on the taking lens barrel for enabling the automatic focus detector circuit for operation by the first manually operable means whenever the taking lens barrel is mounted on the camera body; and a second automatic focus detector circuit being disposed within the camera body and being connected to a display element which displays the focus status within the camera body.

7. An automatic focus controlling camera according to claim 6 in which the camera body includes blocking means connected to a power supply circuit for the second automatic focus detector circuit, the blocking means disabling the operation of the second automatic focus detector circuit whenever the taking lens barrel is mounted on the camera body.

* * * * *

UNITED STATES PATENT AND TRADEMARK OFFICE
CERTIFICATE OF CORRECTION

PATENT NO. : 4,542,972

DATED : September 24, 1985

INVENTOR(S) : Yukio Nakajima

It is certified that error appears in the above-identified patent and that said Letters Patent is hereby corrected as shown below:

Column 7, line 11, change "precautions" to --precaution--.

Signed and Sealed this

Eighteenth Day of March 1986

[SEAL]

Attest:

DONALD J. QUIGG

Attesting Officer

Commissioner of Patents and Trademarks